(12) United States Patent
Kanbara et al.

(10) Patent No.: US 7,193,617 B1
(45) Date of Patent: Mar. 20, 2007

(54) ACOUSTIC CONTACT DETECTING DEVICE (75) Inventors: Shigeki Kanbara, Hineji (JP); Hiroshi Kaneda, Himeji (JP)

(73) Assignee: Touch Panel Systems, Tokyo (JP)

( * ) Notice: Subject to any disclaimer, the term of this patent is extended or adjusted under 35 U.S.C. 154(b) by 360 days.

(21) Appl. No.: 10/019,190

(22) PCT Filed: Jun. 29, 2000

(86) PCT No.: PCT/JP00/04295

§ 371 (c)(1),
(2), (4) Date: Mar. 13, 2002

(87) PCT Pub. No.: WO01/02944

PCT Pub. Date: Jan. 11, 2001

(30) Foreign Application Priority Data

Jun. 30, 1999 (JP) ................ 11/186418

(51) Int. Cl.
*G09G 5/00* (2006.01)
(52) U.S. Cl. .............. 345/177; 345/173; 310/313
(58) Field of Classification Search .......... 345/177, 345/173, 18.01, 18.04, 179; 178/18.04, 18.01; 310/313 A, 313 R, 313
See application file for complete search history.

(56) References Cited

U.S. PATENT DOCUMENTS

| 4,144,519 A | | 3/1979 | Chamuel ............ 367/125 |
| 4,645,870 A | * | 2/1987 | Adler ................ 345/177 |
| 4,700,176 A | * | 10/1987 | Adler ................ 341/20 |
| 4,745,240 A | | 5/1988 | Furukawa et al. ..... 178/18.05 |
| 4,926,010 A | | 5/1990 | Citron ............... 178/18.07 |
| 5,009,708 A | | 4/1991 | Grunwald et al. ..... 106/1.05 |

(Continued)

FOREIGN PATENT DOCUMENTS

CN 1102910 A 7/1994

(Continued)

OTHER PUBLICATIONS

International Search Report for PCT/JP00/04295, dated Aug. 22, 2000.

(Continued)

*Primary Examiner*—Richard Hjerpe
*Assistant Examiner*—Kimnhung Nguyen (57) ABSTRACT

An object of the present invention is to provide a coordinate input device of touch-type capable of giving an electric signal to a transducer, even if a piezoelectric vibrator having electrodes on both surfaces thereof is employed.

A device according to the present invention comprises: acoustic wave transducers (piezoelectric vibrators) $3a$ and $4a$, each functioning for oscillating a bulk wave (a first wave) toward a top surface 2 of a substrate 1; a planar wiring 7 formed on a back surface of the substrate 1 by the method such as transfer printing with conductive paste, for supplying said piezoelectric vibrator with electric power; a connecting device 8 for connecting said planar wiring with an electrode of each of said acoustic wave transducers $3a$ and $4a$; diffractive acoustic wave mode couplers $9a$–$10b$, each functioning for converting said bulk wave into a surface acoustic wave (a second wave) and vice versa; and a means for detecting a scatter in the surface acoustic wave (the second wave) on the top surface of said substrate. Employing the combination of the planar wiring and the connecting device can resolve the problem of fragility associated with a cable wiring even in the piezoelectric vibrator having the electrodes on both surfaces thereof.

11 Claims, 3 Drawing Sheets

U.S. PATENT DOCUMENTS

| | | | |
|---|---|---|---|
| 5,250,869 A | 10/1993 | Ishikawa et al. | 310/334 |
| 5,374,908 A * | 12/1994 | Wright | 333/195 |
| 5,572,205 A | 11/1996 | Caldwell et al. | |
| 5,573,077 A * | 11/1996 | Knowles | 178/18.04 |
| 5,591,945 A | 1/1997 | Kent | 178/18.04 |
| 5,739,479 A | 4/1998 | Davis-Cannon et al. | 178/18.04 |
| 5,771,039 A | 6/1998 | Ditzik | |
| 5,852,487 A | 12/1998 | Fujimori et al. | |
| 5,856,820 A * | 1/1999 | Weigers et al. | 345/177 |
| 5,869,791 A | 2/1999 | Young | |
| 6,040,823 A | 3/2000 | Seffernick et al. | |
| 6,087,599 A * | 7/2000 | Knowles | 178/18.04 |
| 6,091,406 A * | 7/2000 | Kambara et al. | 345/177 |
| 6,186,005 B1 * | 2/2001 | Leidl | 73/597 |
| 6,473,069 B1 | 10/2002 | Gerpheide | |
| 6,567,077 B2 | 5/2003 | Inoue et al. | |
| 2001/0033274 A1 | 10/2001 | Ong | |
| 2003/0063088 A1 | 4/2003 | Machida et al. | |

FOREIGN PATENT DOCUMENTS

| | | |
|---|---|---|
| EP | 0 354 117 | 2/1990 |
| JP | 56-137989 | 10/1981 |
| JP | 61-129222 | 8/1986 |
| JP | 61-193492 | 8/1986 |
| JP | 04-136872 | 12/1992 |
| JP | 06-324792 | 11/1994 |
| JP | 09-295467 | 11/1997 |
| JP | 10-240443 | 9/1998 |
| WO | WO98/29853 | 7/1998 |

OTHER PUBLICATIONS

International Preliminary Examination Report for PCT/JP00/04295, dated Oct. 19, 2000.

* cited by examiner

ACOUSTIC CONTACT DETECTING DEVICE

FIELD OF THE TECHNOLOGY

The present invention relates to an acoustic contact detecting device or a coordinate input device of touch-type, such as a touch panel of an ultrasonic method, for acoustically detecting a contact point and also to a substrate for the same device.

DESCRIPTION OF THE PRIOR ART

A touch panel has been used broadly as an input device for an interactive computer system in various applications including a kiosk information terminal or an order input method at a restaurant. A known typical touch panel includes a touch panel of a resistive film method, a touch panel of an electrostatic capacity method and a touch panel of an acoustic method. The touch panel of the acoustic method, especially an ultrasonic touch panel, is distinctively advantageous if a highly robust contact sensing face and/or an improved transmittance of a display image is required.

A variety of transducers (especially, wedge transducers) have been used to connect or couple a piezoelectric vibrator with a touch substrate in the touch panel of the acoustic method. Herein, the transducer is meant to be one or a series of physical elements for converting energy from one mode to another, including interconversions between acoustic wave modes and between electric energy and acoustic energy. A typical transducer of piezoelectric method is made of a piezoelectric vibrator in the shape of prism having a conductive material on a top surface thereof and coupled acoustically with a top surface of a substrate via a metal electrode having a contact with an element on the top surface of the substrate (e.g., a wedge material) and/or by way of a specific arrangement of the surface of the piezoelectric element onto the top surface of the substrate. Further, a cable wired around the panel is used to supply an electric signal to the piezoelectric vibrator and to receive the signal oscillated by the piezoelectric vibrator.

Said wedge transducer takes advantage of such a phenomenon that an acoustic wave is refracted when the acoustic wave enters diagonally to the interface between different media and thereby the wedge transducer may cause an excitation of a surface wave or a plate wave in the substrate. A typical wedge transducer comprises a piezoelectric vibrator adhered to one of side faces and a plastic wedge with its oblique side bonded to a substrate (e.g., a glass substrate), in which the piezoelectric vibrator is coupled with a bulk wave via the wedge material. The bulk wave is refracted at a critical angle, namely "a wedge angle", and propagated along the surface of the glass and the surface wave is refracted at said critical angle and propagated as a bulk wave. Thus, the wedge transducer may be used both for transmitting and receiving of the surface waves including a Rayleigh wave and a Love wave and also the plate waves including a Lamb wave.

In contrast, a direct coupling of the piezoelectric vibrators or an edge transducer generally causes directly an excitation of an acoustic wave having high energy in the top surface of the substrate. The edge transducer has been used in the most ordinary course for the coupling with the plate wave. Some considerations have been directed to develop an edge transducer for coupling with the Rayleigh wave. Although such an edge transducer is small in size, the exposed piezoelectric transducer remains unguarded.

On the top surface of the touch panel, the wedge-type transducer should be inevitably disposed in a higher level than the top surface of the panel. Besides, when a display is formed by a curved face panel such as an ordinary cathode-ray tube, a space available for accommodating the wedge transducer resides between the curved face panel and an outer frame covering the periphery of this curved face panel. However, when the display is formed by a flat panel such as a liquid-crystal display or a plasma display, there is no gap left between the panel and the outer frame in the peripheral region of the panel surface covered with the outer frame and thus no space is available for accommodating the wedge transducer. Accordingly, with the wedge transducer, the touch panel of the ultrasonic method is not fully adaptable to the flat panel. Further, there should be a strict restriction in the display and the outer frame structure available for the application. Especially, when the wedge transducer is employed in an acoustic touch sensor using the Rayleigh wave, there could be a fear that the mechanical designing may become complicated, thereby limiting the options.

If a touch panel of the ultrasonic elastic surface wave method is applied to the LCD, there would be a problem arisen in association with a cable to be used for transmitting/receiving the electric signal to/from the piezoelectric vibrator. The wedge transducer is basically disposed on the top surface of the substrate. With this arrangement, the cable is also required to be wired on the top surface of the substrate and another requirement may arise to secure a space for the cable outside of a reflective array. Further, it is difficult to automate a wiring operation for the cable and not a few portions are required to be fabricated by hand. This could be a big hurdle for improving productivity. Besides, a stress concentration is apt to occur in a joint portion between the piezoelectric vibrator and the cable, leading to peeling-off of the solder or crack in the piezoelectric vibrator. For the reasons stated above, the wedge transducer is not suitable for the liquid-crystal display (LCD).

The Japanese patent laid-open publication No. Hei 10-240443 has disclosed a grating transducer aiming for a solution to the problems described above. In this grating transducer, a piezoelectric vibrator is adhered to a back surface of a glass substrate or to a third face arranged between an end face and the back surface thereof so as to cause an excitation of a bulk wave inside the glass substrate, and then a diffraction grating arranged on a top surface thereof converts the mode of the bulk wave and thereby causes the excitation of such a wave that has energy concentrated in the surface, which is typically represented by an elastic surface wave. Since this transducer has no need for the wedge, the concavity and convexity in the top surface can be made almost zero. Further, the piezoelectric vibrator can be mounted on the back surface, thereby achieving a small-footprint of the device. However, the cable wiring is still a factor inhibiting the improvement of the productivity and the mechanical fragility remains unsolved.

Further, there is another problem associated with the grating transducer that complexity in the electrode structure of the piezoelectric vibrator may lead to cost increase. A position detecting device using the grating transducer requires structurally that the acoustic wave transducer (the piezoelectric vibrator) is bonded directly to a glass substrate. Because of this requirement, in a piezoelectric vibrator of parallel-electrode type having a pair of electrodes formed on either surface of a piezoelectric substrate made of, for example, piezoelectric ceramic, it is difficult to make a connection with one of the electrodes of the piezoelectric vibrator on the bonding surface side to the glass substrate, and in addition it is more difficult to establish an electrical connection with the other electrode of the piezoelectric vibrator disposed on the opposite side with respect to the glass substrate.

To overcome this problems, in the touch panel (or the touch sensor) having the grating transducer, the electrode formed on one of the surfaces of the piezoelectric substrate is bent and extended along the side wall up to the other surface of the substrate, so that both of the electrodes can be positioned in opposition to each other on the other surface of the substrate thus to ensure the connectivity with the electrodes. However, the piezoelectric vibrator having such structure may increase the cost as the number of manufacturing processes is increased. Further, the workability in fabricating the wiring onto the back surface of the glass substrate, especially that onto the back surface of an arched or curved substrate having a concave surface, could be degraded seriously.

In the light of the problems described above, an object of the present invention is to provide an acoustic contact detecting device or a coordinate input device of touch-type having wired with high reliability to a transducer (especially a piezoelectric vibrator) having electrodes (drawing electrodes) on both surfaces and also to provide a substrate for the same device.

Another object of the present invention is to provide an acoustic contact detecting device or a coordinate input device of touch-type which can accomplish a wiring in sure and efficient manner while inhibiting the profile of the device from being increased undesirably even if an acoustic transducer is constituted of a piezoelectric vibrator of parallel-electrode type having electrodes disposed both surfaces of a piezoelectric substrate, and also to provide a substrate for the same device.

Still another object of the present invention is to provide an acoustic contact detecting device or a coordinate input device of touch-type which can accomplish a wiring in sure and efficient manner with high reliability even if a transducer is disposed on a back surface of a substrate still, and also to provide a substrate for the same device.

Still another object of the present invention is to provide an acoustic contact detecting device or a coordinate input device of touch-type including substantially no cable wiring on a substrate or a panel, and also to provide a substrate for the same device.

DISCLOSURE OF THE INVENTION

The inventors have dedicated themselves on the research in order solve the above problems and accomplish the present invention based on the finding that if conductive paste is used to provide a planar wiring to an electrode disposed on one of the surfaces of the piezoelectric vibrator and a connecting device (a connecting unit or a connector) is intervened to provide the planar wiring to an electrode disposed on the other surface of the piezoelectric vibrator, then it can ensure the electrical connection to be established even to the back surface while inhibiting the increase in profile, and this form of wiring can ensure the supply of electric power or an electric signal to the piezoelectric vibrator constituting the transducer with high reliability and thereby resolve the problem of fragility associated with a cable wiring.

That is, an acoustic contact detecting device according to the present invention comprises the following components. The device includes: (a) a substrate having a top surface; (b) an acoustic wave transducer for coupling with a first wave representative of a bulk wave being propagated through said substrate along an axis crossing said top surface; (c) a planar wiring for supplying said acoustic wave transducer with electric power; (d) a connecting device for connecting said acoustic wave transducer with said planar wiring; (e) a diffractive acoustic wave mode coupler having a mode of converted wave having high energy in said top surface and functioning for coupling a second wave being propagated along an axis parallel to said top surface with said first wave; and (f) a means for detecting a perturbation in energy of said second wave.

Further, a coordinate input device of touch type according to the present invention comprises: a propagation medium having a top surface capable of propagating an acoustic wave; a bulk wave generation means for propagating a bulk wave in a crossing direction with respect to said top surface of this propagation medium; a planar wiring for supplying this bulk wave generation means with electric power; a connecting device for connecting said bulk wave generation means with said planar wiring; an acoustic wave generation means for converting this bulk wave into an acoustic wave and propagating said acoustic wave on the top surface of said propagation medium; and a detecting means for detecting a scatter on the surface of the acoustic wave from this acoustic wave generation means.

In such a device, the wiring is electrically connected to the piezoelectric vibrator, and said wiring (or a printed wiring) and said connecting device together constitute a system for supplying the electric power to the piezoelectric vibrator to be applied to the transducer system for the acoustic wave touch screen. That is to say, according to the present invention, the electric power or the electric signal to the piezoelectric vibrator is supplied through the wiring (the wiring formed by, for example, a transfer printing) disposed on the panel (especially, on the back surface of the panel) via the connecting device. Said acoustic wave transducer may be composed of the piezoelectric vibrator and said wiring may be formed by the conductive paste. For example, the conductive paste may be printed or applied with a predetermined pattern, and after having been dried, it is baked thus to form the wiring. The wiring may be directly printed on the substrate or formed thereon by the transfer printing. Since in the present invention, the wiring has been made planar, the wiring can be applied to either of the top or the back surface of the substrate. The shape of said connecting device (the connecting unit) is not specifically limited to some figure but it may be made of a conductor having a different level of step corresponding to the profile of the acoustic wave transducer. In specific, if the acoustic wave transducer is constituted of the piezoelectric substrate and the piezoelectric vibrator having the electrode sections disposed on either surface of this piezoelectric substrate, the planar wiring may be constituted of a first wiring section capable of contacting with one of the electrode sections of the piezoelectric vibrator by way of face contact or line contact and a second wiring section spaced and insulated from this first wiring section, in which the connecting device may be formed in a shape capable of connecting the other electrode section of the piezoelectric vibrator with said second wiring section.

The present invention also includes a substrate to be used in said device. This substrate may be used for an acoustic detecting device and have the following components and a top surface. The substrate comprises: (a) an acoustic transducer coupled with a bulk wave having a propagation axis crossing said top surface in the substrate; (b) a wiring for supplying this acoustic wave transducer with electric power, said wiring being printed on a back surface of said substrate; (c) a connecting device for connecting said acoustic wave transducer with said wiring; (d) a diffractive acoustic wave mode coupling structure formed in proximity to said surface for converting acoustic energy of the bulk wave into a wave to be propagated along an axis parallel to said top surface; and (e) a means for detecting the converted acoustic wave energy corresponding to a location of a perturbation.

Since the present invention provides the wiring which has been made planar, it can resolve the mechanical fragility resulting from the cable and ensure an electric signal to be transmitted and received with higher reliability. Besides, the printing or application technology may be used to form the wiring, which may facilitate the automatic fabrication and thus improve the productivity. Further, the use of the transfer printing technology can present a broad selection for the shape of the printing object and a possibility of the wiring to be disposed even on an arched panel or a spherical panel.

It is to be noted that in the specification of the present invention the term "planar wiring" is meant to be a wiring, such as a printed wiring, that is made substantially in the planar form and capable of connecting electrically to an acoustic wave transducer (or a piezoelectric vibrator) by way of line contact or face contact.

Further, since a high frequency alternating current is used in the acoustic wave touch screen of the present invention, if a relatively low-profile insulator resides between a metal electrode and the printed wiring including a connector extending from said wiring, said insulator can function as a condenser to enable the transmitting and receiving of the electric signal. In this context, said term "electrical connection" may not necessarily be limited to the connection established exclusively by the conductor.

DETAILED DESCRIPTION OF THE PREFERRED EMBODIMENTS

The present invention will now be described below in more detail with reference to the attached drawings where necessary.

Figure 1:
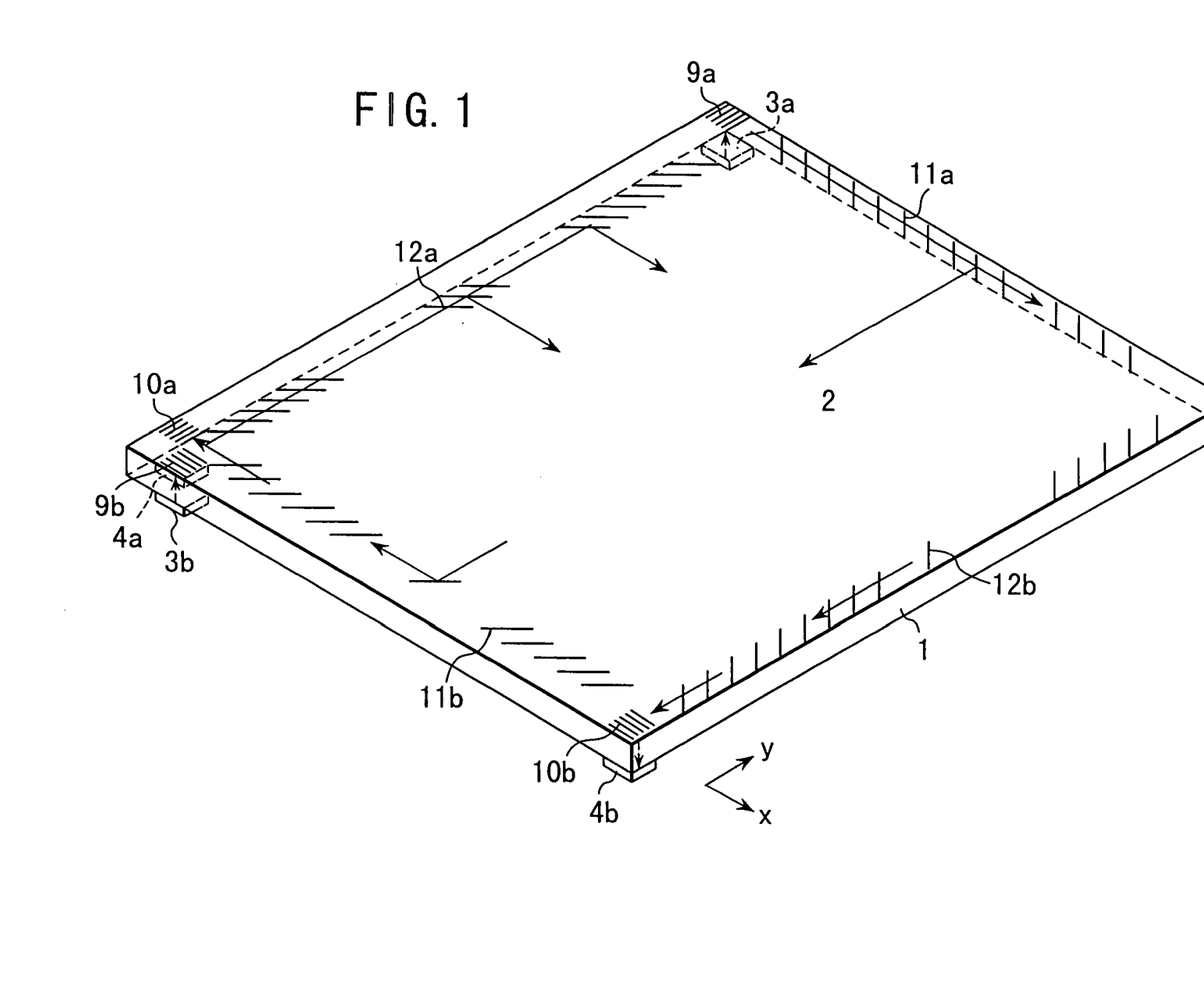
FIG. 1 is a schematic perspective view of an embodiment of a device according to the present invention.
Figure 2:
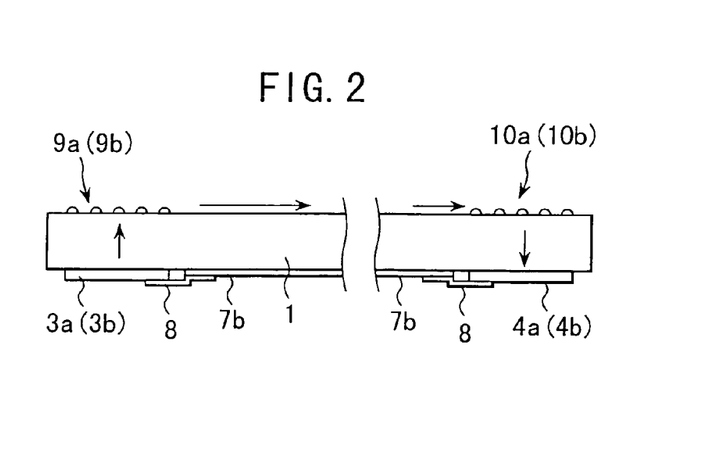
FIG. 2 is a schematic cross sectional view of the device shown in FIG. 1.
Figure 3:
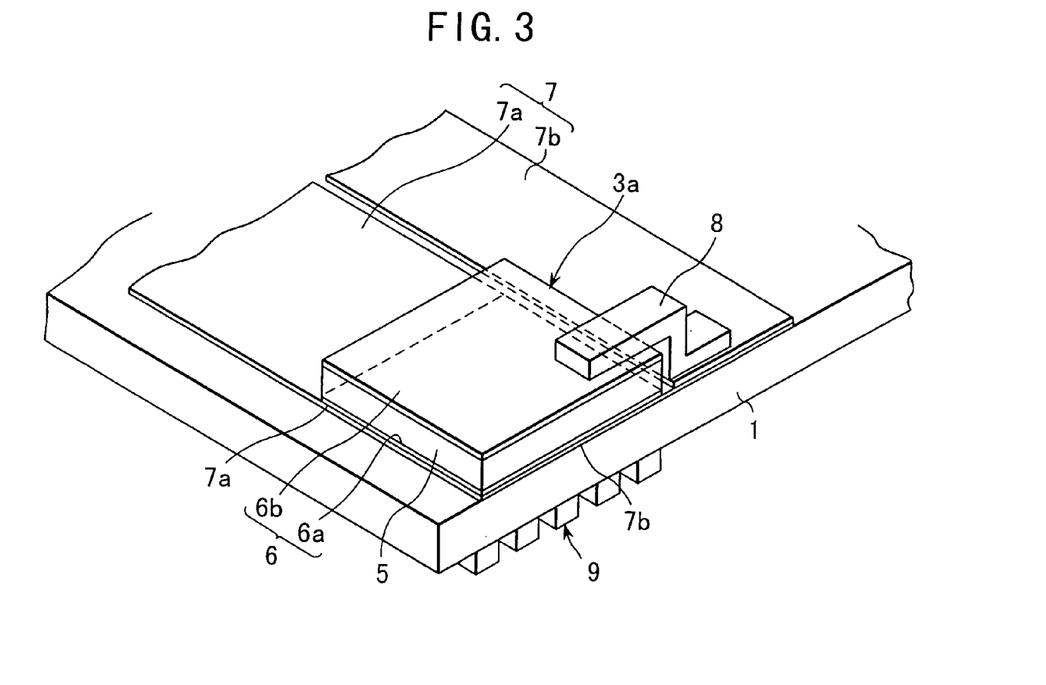
FIG. 3 is a schematic perspective view, illustrating a form of interconnection between a planar wiring section and an acoustic wave transducer in the device shown in FIG. 1.

FIG. 1 is a schematic perspective view of an embodiment of a device according to the present invention, FIG. 2 is a schematic cross sectional view of the device shown in FIG. 1, and FIG. 3 is a schematic perspective view illustrating a form of interconnection between a planar wiring section and an acoustic wave transducer in the device shown in FIG. 1.

Said device capable of acoustically detecting a contact point (the coordinate input device of touch-type) comprises a substrate 1 serving as a propagation medium having a top surface capable of propagating an acoustic wave (a surface wave or a plate wave), acoustic wave transducers 3, 4, each being mounted to a bottom face (or a back surface) of said substrate and composed of a piezoelectric vibrator, and a planar wiring 7 formed on the bottom face of said substrate 1 for supplying electric power or an electric signal to each of said acoustic wave transducers 3, 4. It is to be noted that the top surface of said substrate 1 has a display region (an image display region) 2 laterally symmetrical with respect to the X-axis and the Y-axis directions.

Each of said acoustic wave transducers 3, 4 comprises a plate-like piezoelectric vibrator rather than a wedge-type transducer in order to reduce a profile and a weight of the device. That is, as shown in FIG. 3, each of the acoustic wave transducers 3, 4 is composed of a piezoelectric substrate 5 such as piezoelectric ceramic and an electrode 6 formed on said piezoelectric substrate, said electrode 6 comprising a first electrode (drawing electrode) 6a formed on one of the surfaces of the piezoelectric substrate 5 and a second electrode (a drawing electrode) 6b formed on the other surface of the piezoelectric substrate 5. It is to be noted that in the plate-like piezoelectric vibrator, at least a part of the electrodes 6a and 6b formed on the respective surfaces of the piezoelectric substrate 5 together forms a counter electrode facing in opposition to each other with the substrate interposed therebetween.

Said acoustic wave transducers 3, 4 comprise transmitting transducers 3a, 3b respectively attached to the back face of the substrate 1 in the X-axis and the Y-axis starting point zones (bottom corner portions along the X-axis and the Y-axis in this illustrative example) and a pair of receiving transducers 4a, 4b respectively attached to the back face of the substrate 1 in the X-axis and the Y-axis ending point zones (bottom corner portions along the X-axis and the Y-axis in this illustrative example). Each of the transmitting transducers 3a, 3b functions as a bulk wave generation means for propagating a bulk wave (either in a longitudinal wave mode or a transverse wave mode) in the crossing direction with respect to the top surface (the front face) of the substrate serving as the propagation medium and each of the receiving transducers 4a, 4b functions as a bulk wave receiving means for receiving the bulk wave being propagated from the top surface (the front face) of the substrate 1 through the substrate in the crossing direction. That is, each of the acoustic wave transducers 3, 4 is coupled with such a bulk wave (a first wave) being propagated through said substrate 1 along the axis crossing the top surface of said substrate 1, in other words, the bulk wave having a propagation axis crossing said substrate 1.

Said planar wiring 7, as shown in FIG. 3, is in the form of printed wiring on a back surface of said substrate 1, and said wiring 7 comprises a first wiring section 7a in the shape of line or flat plate extending and thus connecting to the first electrode 6a of each of the acoustic wave transducers (or the piezoelectric transducers) 3, 4 and a second wiring section 7b spaced and insulated from this first wiring section, which has been made in the shape of line or flat plate extending and thus connecting to the second electrode 6b. It is to be noted that, in the illustrated example, the first wiring section 7a and the second wiring section 7b extend approximately parallel with each other while being insulated from each other, and the first wiring section 7a is connected to the first electrode 6a on the piezoelectric substrate 5 (i.e., the electrode disposed on the side of the substrate 1) by means of face contact.

On the other hand, the second electrode 6b of the piezoelectric substrate 5 is connected with the second wiring section 7b via the connecting device (the connecting unit or the connector) 8 made of conductive material. This connecting device 8 has been designed to be formed into a bent shape having a step corresponding to the profile of said acoustic wave transducer (the piezoelectric vibrator), so that the connecting device 8 can provide an interconnection in the form of bridge between the electrode 6b and the second wiring section 7b. One end of the connecting device 8 is capable of contacting with the second electrode 6b of said piezoelectric substrate 5 (specifically by way of face contact) and the other end of the connecting device 8 is capable of bridging over the insulating section adjacent to said first wiring section 7a and thus contacting with said second wiring section 7b by way of face contact. Besides, in order to prevent the profile from becoming high, said connecting device 8 is made of sheet-like or strip-like conductive material, which has been bent thus to be formed into the desirable shape.

Bulk waves (first waves) are emitted from the oscillating transducers 3a and 3b of said acoustic wave transducers 3 and 4 through the substrate 1 toward mode-converting sites (regions of perturbation or oscillation) in the top surface (the front face) of the substrate 1, and herein the bulk waves which have reached to the mode-converting sites are converted to acoustic waves (surface waves or plate waves), or specifically surface acoustic waves (second waves), with the aid of an X-axis and a Y-axis acoustic mode couplers (diffractive acoustic wave transducers) 9a and 9b disposed in said mode-converting site. This surface acoustic wave is in the mode of converted wave having high energy on the top surface of the substrate. That is, each of the acoustic mode couplers (the diffractive acoustic wave transducer) 9a and 9b functions as an acoustic wave generation means so as to couple said bulk wave (the first wave) with the surface wave (the second wave) being propagated in the proximity of the top surface of the substrate 1 along the axis parallel to the top surface of the substrate 1, and is capable of converting the mode of the acoustic wave from the bulk wave to the surface wave or vice versa. In this example, each of the acoustic mode couplers 9a and 9b comprises a diffractive acoustic wave mode coupler (or a grating transducer), namely a diffraction grating.

In a first pair of opposite side portions on the top surface of said substrate 1, X-axis reflecting means 11a, 11b extending respectively in the X-axis direction are arranged in opposition to each other, and in a second pair of opposite side portions on the top surface of the substrate 1, Y-axis reflecting means 12a, 12b extending respectively in the Y-axis direction are arranged in opposition to each other. Each of those reflecting means is composed of a reflective array including a group of arrays angled at about 45° with respect to the traveling direction of the surface acoustic wave, in which the array of the reflective array transmit a portion of the surface acoustic wave. Owing to this, the surface acoustic waves (the surface waves or the plate waves, especially the surface elastic waves) which have been converted by the acoustic coupler 9a, 9b are, on the top surface of the substrate 1, reflected along the Y-axis and the X-axis directions respectively by a first X-axis reflecting means (a reflective array) 11a and a first Y-axis reflecting means (a reflective array) 12a so as to be propagated entirely over the display region 2 on the top surface of the substrate 1.

The surface acoustic waves which have been reflected in the Y-axis and the X-axis directions are further reflected in the X-axis and the Y-axis directions by the second X-axis reflecting means (a reflective array) 11b and the second Y-axis reflecting means (a reflective array) 12b so as to be directed to the X-axis and the Y-axis acoustic mode couplers 10a and 10b in the mode converting sites (the regions of receiving or perturbation). The acoustic mode couplers 10a, 10b are configured similarly to said acoustic mode couplers 9a, 9b thus to convert the surface acoustic waves into the bulk waves. The converted bulk waves are, as similarly to the preceding description, received by the acoustic wave transducers (the X-axis and the Y-axis receiving transducers) 4a and 4b composed of piezoelectric vibrators and then converted to electric signals.

The X-axis and the Y-axis receiving transducers 4a, 4b are electrically connected to the planar wirings (not shown) formed on the back surface of the substrate 1 as is the case of the interconnection between the electrodes 6a, 6b of said piezoelectric vibrator and the planar wirings 7a, 7b partially including the connecting device 8, and thereby the signals from the receiving transducers 4a and 4b are sent to a detecting means via the planar wirings.

Herein, taking advantage of the fact that a disturbing or scattering component in a received signal, which may be caused by a touch to the image display region 2, corresponds to an attenuation information of the received information in time sequence, the detecting means of the controller can process and thus analyze or interpret the signals from the receiving transducers 4a and 4b so as to determine the perturbation of the energy of the surface acoustic wave (the second wave) from the acoustic wave generation means appeared on the top surface of the substrate (and thus the position of the perturbation corresponding to the position of the touching).

Alternatively, a cable may be used for electrical connection between the planar wirings for said acoustic receiving transducers (such as piezoelectric vibrators) 4a, 4b and the controller. In order to improve the fragility associated with the cable, however, it is preferred to use a cable capable of tightly contacting with the substrate (for example, a heat sealing cable) so as to prevent the cable from being released from the substrate.

In the substrate equipped with such an acoustic contact detecting device (or unit) and said surface features and elements as described above, the connecting device can ensure the electrical connection between the electrodes of the acoustic wave transducer and the wiring sections even if the acoustic wave transducer having the electrodes (the drawing electrodes) formed on the both surfaces of the substrate is employed. Further, since the planar wiring is used for the interconnection, the stress concentration in the point of the connection is prevented and the mechanical fragility resulting from the cable can be resolved, thereby ensuring the transmitting and receiving of the electric signal to/from the acoustic wave transducer via the planar wiring with high reliability. In addition, since the combination of the planar wiring with the plate-like acoustic wave transducer and the thin connecting device allows the profile of the wiring section to be reduced significantly and also the wiring to be formed by means of printing or applying, thereby it may facilitate the automatic fabrication and thus improve the productivity. Further, the use of the transfer printing technique may provide not only broader options in selecting the shape of the printing object but also a possibility for the wiring to be applied to the back surface of an arched panel or a spherical panel. Owing to these advantages, the profile and weight of the device can be reduced to a great degree, which makes it possible to favorably apply this device to a liquid-crystal display (LCD) and/or a plasma display.

It is to be noted that said wiring may be formed in a predetermined site on the substrate so as to match the shape of the electrode of the acoustic wave transducer (e.g., the piezoelectric vibrator), and it may be formed in a variety of patterns to enable the electrical connection with the acoustic wave transducer (e.g., the piezoelectric vibrator) by way of the line contact or the face contact.

Although a variety of circuit forming methods may be employed to form said wiring, including, for example, a method by way of the lithography technique using a conductive film forming means (evaporation, sputtering and so forth), hot resist, etching and so on, however, in order to fabricate the wiring in a simple but efficient manner, it is rather advantageous to use conductive paste, for example, the paste containing therein a conductive agent such as silver, aluminum, copper, or conductive carbon black. To increase the reliability of the wiring, preferably such conductive paste should be used that may be able to form a conductive pattern with high bonding strength by baking.

The wiring may be directly or indirectly formed on the substrate. For example, the planar wiring may be formed by printing or applying (including marking with a plotter or by writing) the conductive paste onto the substrate. In a preferred embodiment, the wiring for applying the electric power or the electric signal to the acoustic wave transducer may be formed in the form of a printed wiring or by way of printing. Especially, in the case where said grating transducer and/or the reflective array are formed in such a sequential manner comprising the steps of printing by way of printing technology (e.g., the screen printing), drying and then baking it, said wiring also may be formed in the similar manner comprising the steps of printing or applying sinterable conductive paste into a predetermined pattern, drying and then baking it. The conductive paste can be printed into the predetermined pattern by such a method as the screen printing.

In the case of arranging the planar wiring on the back surface of the substrate, although it is possible to print the pattern directly on the back surface of the substrate, it may be more favorable for the curved back surface of the substrate to form the wiring indirectly thereon by the transfer printing technique or the like. The transfer printing may be performed in various methods in which, for example, after the pattern having been formed on a transfer medium by using the conductive paste, then the pattern is transferred onto the back surface of the substrate. For example, in the case of forming the wiring by baking, primarily a predetermined conductive pattern is formed on the base film, and secondarily the base film or the conductive pattern is brought into tight contact with the back surface of the substrate, which is then heated and thus baked, thereby vanishing the base film and completing the formation of the wiring pattern.

It is to be noted that the baking may be conducted in an inert gas atmosphere, and in the case of the transfer printing using the above described base film, it should be conducted in the atmosphere containing oxygen. The baking temperature may be selected depending on the substrate material to be used within a range defined as, for example, 300° C. and higher but lower than a fusion point or a heat deformation temperature for the substrate material, and it may be appropriately selected typically in a range of 300 to 1200° C. and preferably in a range of about 400 to 1000° C.

The connecting device is only required to be capable of providing the electrical connection between at least one electrode (for example, the first electrode) of the acoustic wave transducer and at least one wiring section (for example, the first wiring section). Typically, one end portion of the connecting device is capable of connecting electrically to the electrode of the acoustic wave transducer and the other end portion of the connecting device is capable of connecting electrically to the wiring section. Further, the connecting device typically has a step corresponding to the profile of the acoustic wave transducer, in which this step section is not necessarily in the L-shape but may be formed in a curved shape or a slope. The connecting device may be typically made of sheet-like (plate-like) conductive material or a conductive plate (e.g., a copper plate, an aluminum plate and the like).

It is to be noted that when a plurality of said acoustic transducers is used, at least one connecting device may be used to establish the electrical connection in the connecting section between the electrode of the acoustic wave transducer and the wiring section but it may not be required to use the connecting device in every one of the connecting sections to provide the electrical connection between the electrode sections and the wiring sections. For example, said connecting device may be used to establish the electrical connection in at least one connecting section, and wire bonding may be used to establish the electrical connections in the other connecting sections between the electrode sections and the wiring sections. Further, a plurality of connecting devices may be applied to a single connecting section between the electrode of the acoustic wave transducer and the wiring section thus to improve connection reliability still further.

Besides, if required, a combination of such a transducer of parallel electrode-type having electrode sections formed on both surfaces of the piezoelectric substrate as described above with a transducer having electrode sections formed as facing in opposition to each other on one surface of the piezoelectric substrate may be also used as an acoustic wave transducer. In that case, the electrode of the former transducer of parallel electrode-type may be connected with the wiring section by using the connecting device, while respective electrodes of the latter transducer may be connected with respective wiring sections without using said connecting device.

The detailed description of the substrate material and the configuration or the shape of the propagation medium, the acoustic wave transducer, the acoustic wave mode coupler, the reflecting means, the means for detecting the perturbation and others, each having been mentioned above, can be seen in the Japanese patent laid-open publication No. Hei 10-240443. For example, an ultrasonic surface elastic wave such as a Rayleigh wave, a Lamb wave, a Love wave, a transverse wave of zero order with horizontally polarized spectral (ZOHPS) and a transverse wave of high order with horizontally polarized spectral (HOHPS) may be referred to as an example of the acoustic wave.

The propagation medium may be made of glass, ceramic, aluminum, polymer and so forth and also may be formed in a stack of non-uniform layers without limiting the shape thereof. The propagation medium may be a flat panel substrate such as a liquid-crystal display or a plasma display or may be a curved face panel as well.

The acoustic wave transducer may be constituted of an acoustic emission element such as a piezoelectric vibrator or a piezoelectric transducer, in which the structure of the piezoelectric vibrator or the piezoelectric transducer is not limited to those shown in preceding embodiments but any different piezoelectric resonators having various electrode structures may be used so far as electrodes (drawing electrodes) are formed on both of the surfaces of the piezoelectric substrate. Such a structure, as disclosed in the specification of the U.S. Pat. No. 4,700,176, in which a surface acoustic wave is reflected onto the opposite side of a reflective array may be used, so that the number of the acoustic wave transducers to be used may be reduced by using a reflected acoustic wave path.

In addition, the acoustic wave transducer may be attached to any appropriate locations on the propagation medium, and it may be formed on, for example, a bottom face or a bottom wall of the substrate as illustrated in the attached drawings, a side face or a side wall of the substrate, a lower side face or an angled surface formed on the side wall. Even in such configuration, since the wiring could be provided by way of the printing or the application, the possibility of breakage of wiring may be reduced significantly.

The interconnection between the electrode of the acoustic wave transducer and the planar wiring may be established in a conventional method by using, for example, an adhesive (such as an adhesive containing thermoplastic or thermosetting resin), a conductive adhesive, a solder and so forth.

Further, the acoustic wave mode coupler may be constituted of a grating transducer, a series of scattering points or scattering elements, a structure of spaced line elements or a grating, a scattering element in the shape of groove and so fourth, which may be arranged in dots or a line, or otherwise arranged in an arc capable of converging or focusing a surface acoustic wave. The acoustic wave mode coupler for converting the bulk wave into the surface acoustic wave and vice versa and also for diffracting those waves toward the predetermined directions is typically constituted of a plurality of linear gratings (grids) which extend periodically in parallel with the direction orthogonal to the traveling direction of the bulk wave.

The reflective array constituting the reflecting means may be made of, for example, glass to be formed as a collective unit (a reflective grating) of reflective array elements, each formed as a projection or a convex portion, or as another collective unit of reflective array elements, each formed as a groove. Those reflective arrays are typically formed in parallel with one another. In order to distribute the uniform acoustic wave energy to respective receiving transducers, the spacing between the reflective array elements may be made smaller in proportion to the distance from the oscillating transducer and the reflection factor thereof may be increased in proportion to the distance from the oscillating transducer. It is to be noted that because said contact detecting device (a touch coordinate input device) is to be disposed in the front portion of the display unit, the reflective arrays are typically positioned in a periphery of the substrate, which is the outside of the detecting region (or the display area), and covered and thus shielded by an outer frame in order to avoid the reflective arrays being visible.

Since the device (or the unit) and the substrate according to the present invention are thin and light in weight, they are preferably applicable to the flat panel or the low-curvature panel in a low-profile display such as a liquid-crystal display device or a plasma display device.

According to the present invention, since the electrical connection with the transducer (especially the piezoelectric vibrator) is established by using the planar wiring and the connecting device, therefore there would be no mechanical fragility resulting from the cable, thereby providing the wiring with high reliability. Further, even if the acoustic wave transducer is a piezoelectric vibrator of parallel-electrode type having the electrodes on both surfaces of the piezoelectric substrate, the wiring can be provided reliably and efficiently, while still inhibiting the profile thereof from becoming higher. Further, even if the transducer is located on the back surface of the substrate, the wiring can be provided still efficiently, and also it is ensured that an electric signal is applied to the transducer (especially the piezoelectric vibrator). Still further, since the printing technology or the like may be used to provide the wiring, it may facilitate the automatic fabrication of the wiring and thus improve the productivity. Owing to those advantages, the present invention can provide the device having substantially no cable wiring on the substrate or the panel.

The present invention will now be described in more detail based on the examples below, but the present invention should not be considered to be limited to those examples.

EXAMPLE 1

A pattern shown in FIG. 3 was printed on a back surface of a substrate made of soda-lime glass by the screen printing method with silver paste used as an ink. After the printing, the object was heated and thus dried in an oven at 120° C. for 10 minutes.

Subsequently, as shown in FIG. 1, an acoustic mode coupler (a grating transducer) and a reflective array were printed on a top surface of the substrate by the screen printing method with glass paste used as an ink and then dried.

Then, the printed pattern together with the glass substrate was baked at a baking temperature in a range of 485° C. to 490° C. with the top keeping period of 10 minutes, and thus the glass substrate with a planar wiring was obtained. It is to be noticed that the height of the grating of the grating transducer is 40 µm and the reflective array element is angled at 45° with respect to the X-axis and the Y-axis.

Figure 4:
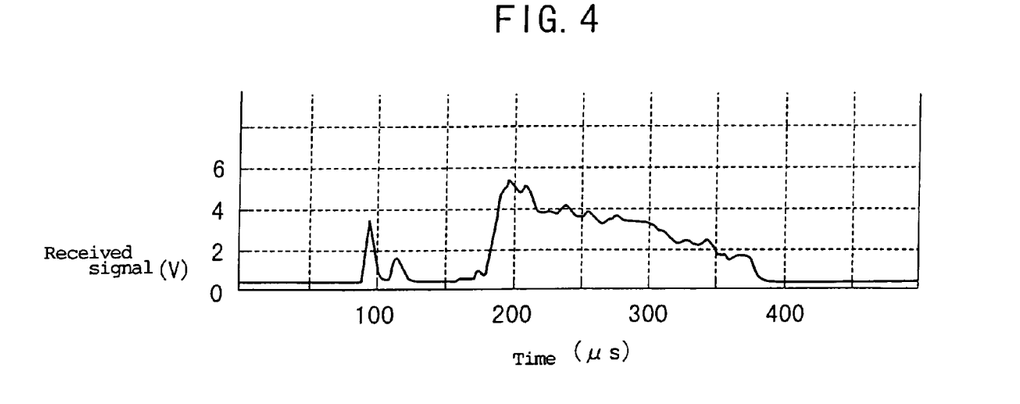
FIG. 4 is a schematic diagram illustrating a received waveform in the device according to the present invention.

One end of copper plate (a connecting device having a bent shape) having a step with a height corresponding to the profile of said piezoelectric vibrator is bonded to one of the electrodes 6b of the plate-like piezoelectric vibrator having the electrodes formed on both surfaces thereof by using a heat-hardening adhesive. Further, on the opposite side to the grating transducer in the obtained glass substrate, the other end of said copper plate is bonded to the planar wiring section 7b, while the other electrode 6a disposed on the other surface of the piezoelectric vibrator is bonded to the planar wiring section 7a thus to fabricate a touch panel having a structure shown in FIG. 3. Then, the wiring section was connected with a controller (manufactured by Touch Panel Systems Co., Ltd) of the touch panel by using a heat sealing cable. FIG. 4 shows a received waveform from the touch panel which has been fabricated in the above manner. It is obvious from the graph that a coordinate signal was converted into an envelope signal. It has been ascertained that the panel has recognized a touching with a finger.

EXAMPLE 2

A pattern shown in FIG. 3 was printed on a polypropylene film fixedly attached onto a substrate, by the screen printing method with silver paste used as an ink. After the printing, the object was heated and thus dried in an oven at 120° C. for 10 minutes.

Subsequently, as shown in FIG. 1, an acoustic mode coupler (a grating transducer) and a reflective array were printed on a top surface of the substrate by the screen printing method with glass paste used as an ink and then dried.

The polypropylene film was tightly contacted to a back surface of the glass substrate and a film having a predetermined pattern printed thereon was further loaded thereon, and then the printed pattern together with the glass substrate was baked at the baking temperature in a range of 485° C. to 490° C. with the top keeping period of 10 minutes, and thus the glass substrate with a planar wiring was obtained.

After baking, it was observed that the wiring by way of the conductive paste was secured to the glass without no residual film remained thereon. It is to be noticed that the height of the grating of the grating transducer is 40 μm and the reflective array element is angled at 45° with respect to the X-axis and the Y-axis.

Then, on the opposite side to the grating transducer in the obtained glass substrate, the electrodes disposed on both surfaces of the piezoelectric vibrator and the planar wirings were electrically connected by using the connecting device made of copper plate in a similar manner to the example 1, thus to fabricate a touch panel having a structure shown in FIG. 3. Then, the wiring section is connected with a controller (manufactured by Touch Panel Systems Co., Ltd.) of the touch panel by using a heat sealing cable. It has been also ascertained that the touch panel fabricated in the above manner exhibited a received waveform similar to that in the example 1 and the touching with a finger was recognized.

What is claimed is:

1. An acoustic contact detecting device comprising
   (a) a substrate having a top surface and a bottom surface;
   (b) an acoustic wave transducer for coupling with a first wave representative of a bulk wave being propagated between the top surface and the bottom surface through said substrate along an axis crossing said top surface, said acoustic wave transducer comprising a piezoelectric substrate and a piezoelectric vibrator having electrode sections disposed on both surfaces of said piezoelectric substrate;
   (c) a planar wiring for supplying said acoustic wave transducer with electric power, said planar wiring comprising a first wiring section capable of contacting with one of said electrode sections of said piezoelectric vibrator by way of line or face contact and a second wiring section spaced and insulated from said first wiring section;
   (d) a connecting device for connecting said acoustic wave transducer with the planar wiring, said connecting device being formed in a form capable of connecting the other electrode section of said piezoelectric vibrator with said second wiring section;
   (e) a diffractive acoustic wave mode coupler having a mode of converted wave having high energy on said top surface and functioning for coupling a second wave being propagated along an axis parallel to said top surface with said first wave; and
   (f) a means for detecting a perturbation in the energy of said second wave.

2. A device in accordance with claim 1, in which said wiring is formed by using conductive paste.

3. A device in accordance with claim 2, in which said wiring is formed by way of transfer printing.

4. A device in accordance with claim 1, in which said wiring is formed by way of transfer printing.

5. A device in accordance with claim 1, in which said wiring is formed on the bottom surface of the substrate.

6. A device in accordance with claim 1, in which said connecting device is made of conductive material having a step corresponding to a profile of said acoustic wave transducer.

7. A coordinate input device of touch-type comprising:
   a propagation medium having a top surface and a bottom surface, said top surface being capable of propagating an acoustic wave;
   a bulk wave generation means for propagating a bulk wave in a crossing direction with respect to said top surface of said propagation medium, said bulk wave generation means comprising an acoustic wave transducer comprising a piezoelectric substrate and a piezoelectric vibrator having electrode sections disposed on both surfaces of said piezoelectric substrate;
   a planar wiring for supplying this bulk wave generation means with electric power, said planar wiring comprising a first wiring section capable of contacting with one of said electrode sections of said piezoelectric vibrator by way of line or face contact and a second wiring section spaced and insulated from said first wiring section;
   a connecting device for providing an electrical connection between said bulk wave generation means and said planar wiring, said connecting device being formed in a form capable of connecting the other electrode section of said piezoelectric vibrator with said second wiring section;
   an acoustic wave generation means for converting said bulk wave into an acoustic wave and propagating said acoustic wave on the top surface of said propagation medium; and
   a detecting means for detecting a scatter in the surface of the acoustic wave from said acoustic wave generation means.

8. A device in accordance with claim 7, in which said wiring is formed by using conductive paste.

9. A device in accordance with claim 7, in which said wiring is formed by way of transfer printing.

10. A device in accordance with claim 7, in which said wiring is formed on the bottom surface of the substrate.

11. A device in accordance with claim 7, in which said connecting device is made of conductive material having a step corresponding to a profile of said acoustic wave transducer.

* * * * *